(12) United States Patent
Kagaya et al.

(10) Patent No.: US 7,703,994 B2
(45) Date of Patent: Apr. 27, 2010

(54) OPTICAL TRANSCEIVER MODULE

(75) Inventors: Osamu Kagaya, Tokyo (JP); Hiroyoshi Ishii, Yokohama (JP); Yasushi Kitajima, Yamato (JP)

(73) Assignee: Opnext Japan, Inc., Yokohama (JP)

( * ) Notice: Subject to any disclaimer, the term of this patent is extended or adjusted under 35 U.S.C. 154(b) by 0 days.

(21) Appl. No.: 12/338,205

(22) Filed: Dec. 18, 2008

(65) Prior Publication Data
US 2009/0180784 A1 Jul. 16, 2009

(30) Foreign Application Priority Data
Dec. 28, 2007 (JP) ............................. 2007-341375

(51) Int. Cl.
*G02B 6/36* (2006.01)
(52) U.S. Cl. ......................... 385/92; 385/147
(58) Field of Classification Search .................. 385/88, 385/89, 92, 141, 147
See application file for complete search history.

(56) References Cited

U.S. PATENT DOCUMENTS

| | | | |
|---|---|---|---|
| 4,470,660 A * | 9/1984 | Hillegonds et al. ............. | 385/58 |
| 5,737,467 A * | 4/1998 | Kato et al. ..................... | 385/92 |
| 5,960,141 A * | 9/1999 | Sasaki et al. ................... | 385/88 |
| 6,999,323 B1 | 2/2006 | Aronson et al. | |
| 7,037,000 B2 * | 5/2006 | Furuichi et al. ................ | 385/93 |
| 7,068,522 B2 | 6/2006 | Aronson et al. | |
| 7,217,042 B2 | 5/2007 | Okada et al. | |
| 7,239,812 B2 * | 7/2007 | Hung et al. .................. | 398/135 |
| 2007/0019964 A1 * | 1/2007 | Whitehead et al. ........... | 398/141 |

FOREIGN PATENT DOCUMENTS

JP 2006-084683 3/2006

OTHER PUBLICATIONS

K. Oki, et al., Electronic Components and Technology Conference 2006, pp. 1567-1572.

\* cited by examiner

*Primary Examiner*—Akm E Ullah
(74) *Attorney, Agent, or Firm*—Mattingly & Malur, P.C.

(57) ABSTRACT

Provided is a metal casing structure capable of avoiding a cavity resonance at 10 GHz and 20 GHz by controlling an eigenmode frequency in an inner space of a casing without involving an increase in cost, and a 10 Gbit/s optical transceiver module which achieves reduction in unnecessary electromagnetic waves and cost. In the optical transceiver module, a metal casing having a cavity therein is formed by an upper casing (100) and a lower casing (101), a metal partition wall (103, 104) is provided on at least one of the upper casing (100) and the lower casing (101) near a central portion of the casing in a direction parallel to a direction connecting a front and a rear thereof, and a length of a gap between the partition wall (103, 104) and a printed circuit board (102) is adjusted.

16 Claims, 7 Drawing Sheets

OPTICAL TRANSCEIVER MODULE

CROSS-REFERENCE TO RELATED APPLICATION

The present application claims priority from Japanese application JP 2007-341375 filed on Dec. 28, 2007, the content of which is hereby incorporated by reference into this application.

BACKGROUND OF THE INVENTION

1. Field of the Invention

The present invention relates to an optical transceiver module for optical communication, and more particularly, to a casing structure of a transceiver for optical fiber transmission having a high-speed transmission rate of 10 Gbit/s.

2. Description of the Related Art

A transceiver module for optical fiber transmission (optical transceiver module) is required to achieve a downsizing and higher speed operation in accordance with a widespread use of broadband network in recent years. For the higher speed operation, an optical transceiver module having a bit rate of 10 Gbit/s is now widely used. (For example, there are used ones having 9.95 Gbit/s and 10.7 Gbit/s compliant with Synchronous Optical Network (SONET), and one having 10.3 Gbit/s compliant with 10 Gigabit Ethernet ("Ethernet" is a registered trademark).) For the downsizing, a reduction in casing capacity is promoted from an older generation 300-pin Multi Source Agreement (MSA) standard to XENPAK, X2, XFP, and SFP+ (which are MSA standards).

On the other hand, a transmission device, on which the optical transceiver module is mounted, is required to suppress an intensity of unnecessary electromagnetic waves generated in the transmission device to a statutory limit value or less. For example, in the United States, it is necessary to satisfy the limit value of 53.9 dB (μV/m) or less which is defined in FCC, Part 15, Subpart B (in a case of Class B, distance: 3 m, frequency range: 1 GHz to 40 GHz).

Due to switching noise and the like of an IC, which is built in the optical transceiver module and operates at 10 Gbit/s, the optical transceiver module generates unnecessary electromagnetic waves in many cases at the frequency of 10 GHz and at the frequency of 20 GHz which is the higher harmonics content thereof. Thus, a design technology for reducing radiation of the unnecessary electromagnetic waves to an exterior of the device is important for both the transmission device and the optical transceiver module.

Kazushige Oki, et al., "The Design Challenge with the Predictable Analysis of the Heat Dissipation and the Electro Magnetic Radiation for 10 Gbps Pluggable Optical Transceivers", 2006 Electronic Components and Technology Conference, pp. 1567-1572 (2006) (hereinafter, referred to as "Non-patent Document") describes a technology for reducing the unnecessary electromagnetic waves at 10 GHz in an X2 MSA optical transceiver module. According to this technology, the structure of a transmitter optical sub-assembly (TOSA) is made with ingenuity, and an exposed portion of the TOSA of the optical transceiver module is connected to a frame ground to be electrically separated from a signal ground of a CAN structure portion of the TOSA. As a result, the unnecessary electromagnetic waves which are radiated through a TOSA/optical-connector connecting portion toward a front surface of the transmission device are reduced.

Further, JP 2006-84683 A discloses a further detailed technology for the TOSA structure of the Non-patent Document.

U.S. Pat. No. 6,999,323 B1 and U.S. Pat. No. 7,068,522 B2 each disclose a casing design technology for reducing radiation of the unnecessary electromagnetic waves in an XFP MSA optical transceiver module. According to this technology, a short circuit part (which is formed by an upper casing column, a board through electrode, and a lower casing column) formed of a conductor is provided at a substantially intermediate position with respect to a casing opening of an edge connector of a printed circuit board, whereby an effective length of the opening is reduced and the unnecessary electromagnetic waves leaking from the opening of the edge connector are reduced.

In recent years, as a condition for the radiation of the unnecessary electromagnetic waves of the transmission device (customer side), on which the optical transceiver module is mounted, becomes severer, when the optical transceiver module is configured with use of the above-mentioned conventional technologies, there is a risk in that the specification for the radiation of the unnecessary electromagnetic waves, which is required for the transmission device, cannot be satisfied. Particularly, diversification of the transmission device on the customer side increases, and, in accordance with an increase in the number of the optical transceiver modules mounted to the same transmission device (multiple mounting) and a reduction in shield amount of the transmission device as a result of cost-reduction of a shielding countermeasure for the transmission device, each of the optical transceiver modules is required to further reduce the radiation of the unnecessary electromagnetic waves.

In the course of examining the reduction of radiation of the unnecessary electromagnetic waves, it was found that the radiation of the unnecessary electromagnetic waves becomes remarkable and difficult to be suppressed when the following conditions coincide. That is, the conditions are (1) a case where an eigenmode (resonance) of a cavity formed inside a metal casing of the optical transceiver module exists near the frequencies of 10 GHz and 20 GHz and, (2) a case where an IC serving as an excitation source and wiring connected thereto (transmission line and the like) are arranged at a position where the eigenmode is excited.

In that case, strong cavity resonance occurs inside the metal casing, and the radiation of the unnecessary electromagnetic waves extremely increases. According to our examination, when the inside of the metal casing is of a rectangular solid shape in the XFP MSA optical transceiver module, a cavity resonant frequency is defined by the dimensions of the optical transceiver module, and the cavity resonant frequency occurs near 10 GHz. In addition, the cavity resonance intends to generate surface current in a perpendicular direction of inner side surfaces of the metal casing. The opening of the metal casing provided to the edge connector of the printed circuit board is orthogonal to this current, and hence the opening functions as a good slot antenna. When the cavity resonance occurs due to the above-mentioned operations, a shielding effect on the unnecessary electromagnetic waves generated from the printed circuit board by using the metal casing becomes remarkably small.

In the technologies described in the Non-patent Document and JP 2006-84683 A, the reduction effect cannot be attained regarding the radiation of the unnecessary electromagnetic waves from the opening of the metal casing of the edge connector. Further, in the technologies described in U.S. Pat. No. 6,999,323 B1 and U.S. Pat. No. 7,068,522 B2, when the cavity resonance described above occurs, the reduction effect is insufficient.

As another method of reducing the radiation of the unnecessary electromagnetic waves due to the cavity resonance, there may be adopted a method of causing a loss of the cavity resonance so as to lower a Q value and a method of changing the resonant frequency so as to avoid the cavity resonance. As specific means for the former, there is known means for arranging an electromagnetic wave absorber formed of a magnetic material and the like inside the metal casing.

However, while the electromagnetic wave absorber is highly effective at low frequency, a permeability of the magnetic material becomes remarkably low at high frequency such as 10 GHz or 20 GHz. Therefore, sufficient reduction effect is difficult to be attained. Further, the electromagnetic wave absorber is a relatively expensive component, and hence there arises a problem in that cost of the optical transceiver module increases when using a large number of the electromagnetic wave absorbers. As the latter means, there may be adopted a method of reducing the dimensions of the inside of the metal casing to raise the resonant frequency. However, it is necessary to largely reduce the area of the printed circuit board capable of being built-in, whereby it is difficult to mount components such as the IC.

SUMMARY OF THE INVENTION

It is an object of the present invention to provide a metal casing structure in a SFP+, XFP, and optical transceiver module having an edge connector, which is capable of avoiding the cavity resonance at 10 GHz and 20 GHz by controlling the cavity resonant frequency without involving an increase in cost, and to provide a 10 Gbit/s optical transceiver module which achieves reduction of the unnecessary electromagnetic waves and suppression of an increase in cost involved therewith.

In the optical transceiver module, a metal casing having a cavity therein is formed by an upper metal casing and a lower metal casing, and a metal partition wall is provided on at least one of the upper metal casing and the lower metal casing near a central portion of the casing in a direction parallel to a direction connecting a front and a rear thereof, whereby the above-mentioned object can be achieved. A TOSA, a ROSA, and a printed circuit board are arranged in the cavity of the inside of the casing, and the edge connector of the printed circuit board is exposed from a slit opening at a rear end portion of the casing.

More specifically, in the optical transceiver module, a minimum gap between the partition wall and the printed circuit board is set within the range from 0.25 mm to 1.0 mm, whereby the above-mentioned object can be achieved.

According to the present invention, it is possible to provide the metal casing structure which is capable of avoiding the cavity resonance at 10 GHz and 20 GHz by controlling an eigenmode frequency in an inner space of the casing without involving an increase in cost, and to provide a 10 Gbit/s optical transceiver module which achieves reduction of the unnecessary electromagnetic waves and suppression of an increase in cost involved therewith.

DETAILED DESCRIPTION OF THE INVENTION

Hereinafter, embodiments of the present invention are described in detail with reference to the drawings.

First Embodiment

Figure 1:
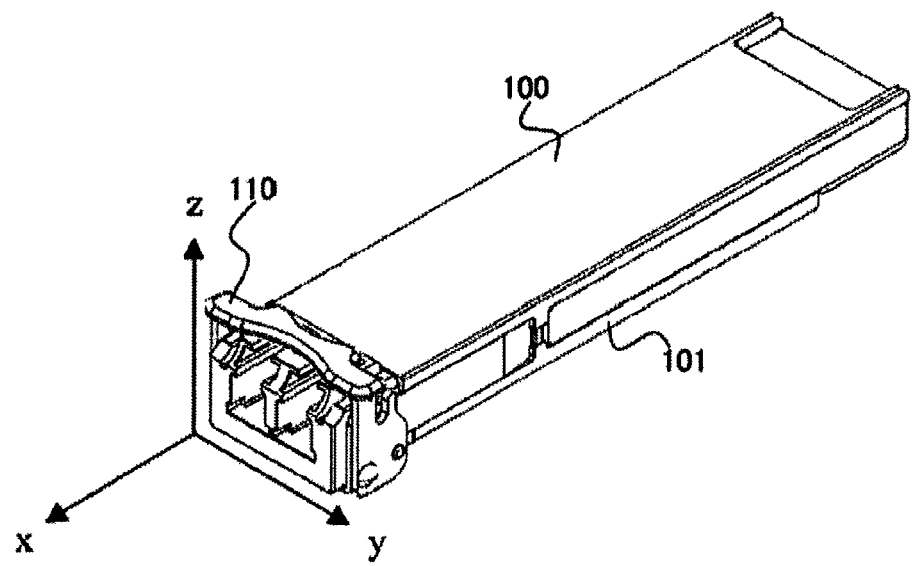
FIG. 1 is a structural view illustrating an appearance of an optical transceiver module according to a first embodiment of the present invention.
Figure 2:
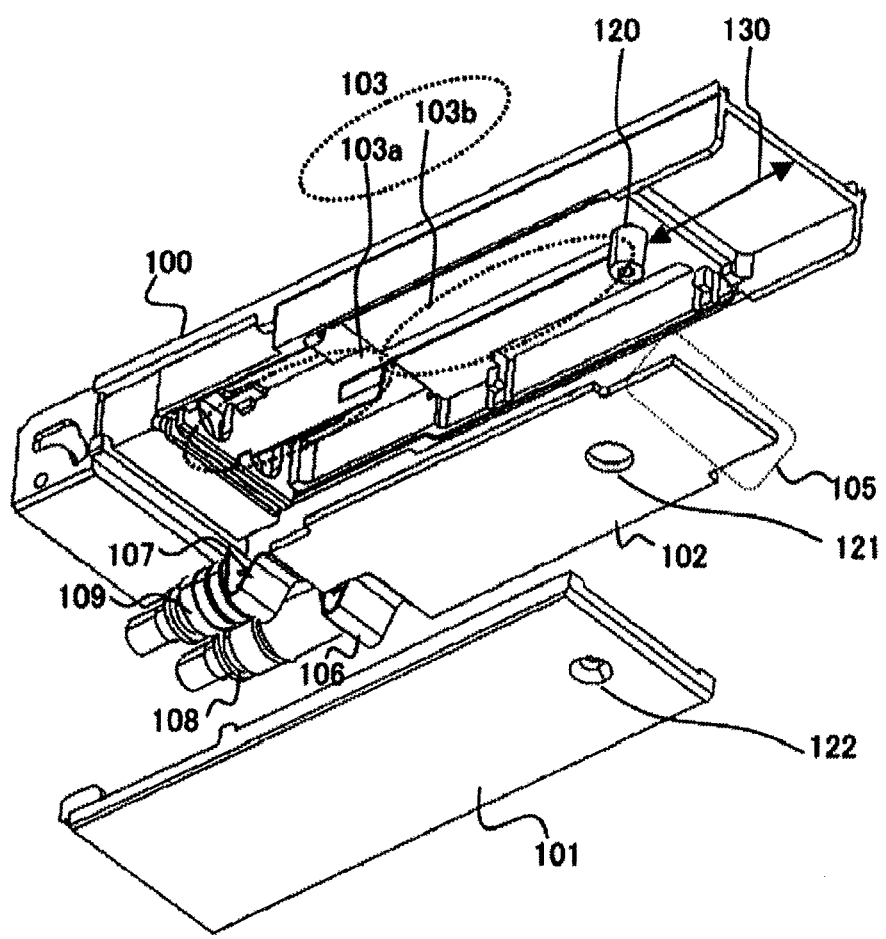
FIG. 2 is a view illustrating an inner structure of an upper casing of the optical transceiver module according to the first embodiment of the present invention.
Figure 3:
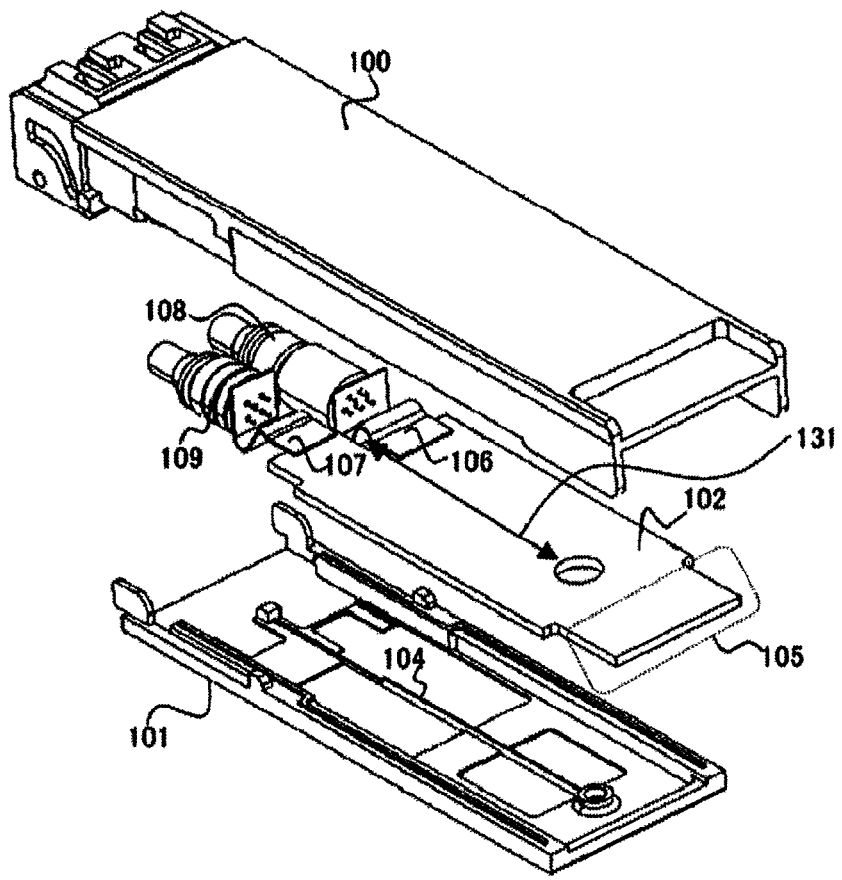
FIG. 3 is a view illustrating an inner structure of a lower casing of the optical transceiver module according to the first embodiment of the present invention.
Figure 4:
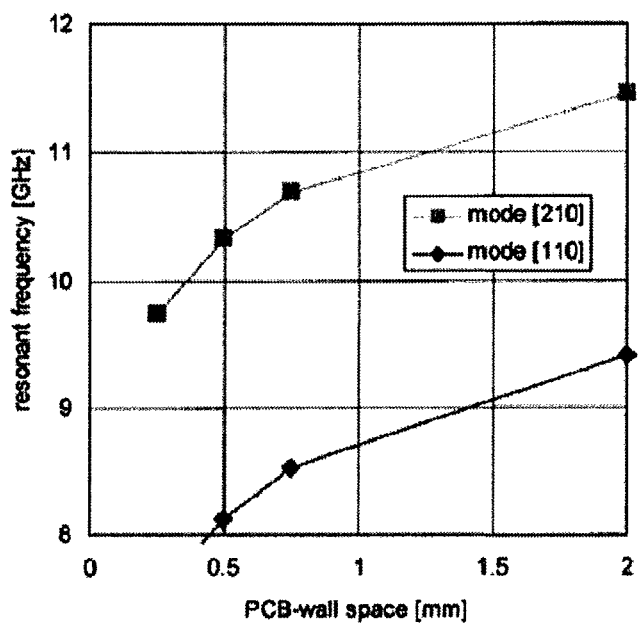
FIG. 4 is a graph showing a change in cavity resonant frequency in an inside of a casing of the optical transceiver module according to the first embodiment of the present invention.
Figure 5:
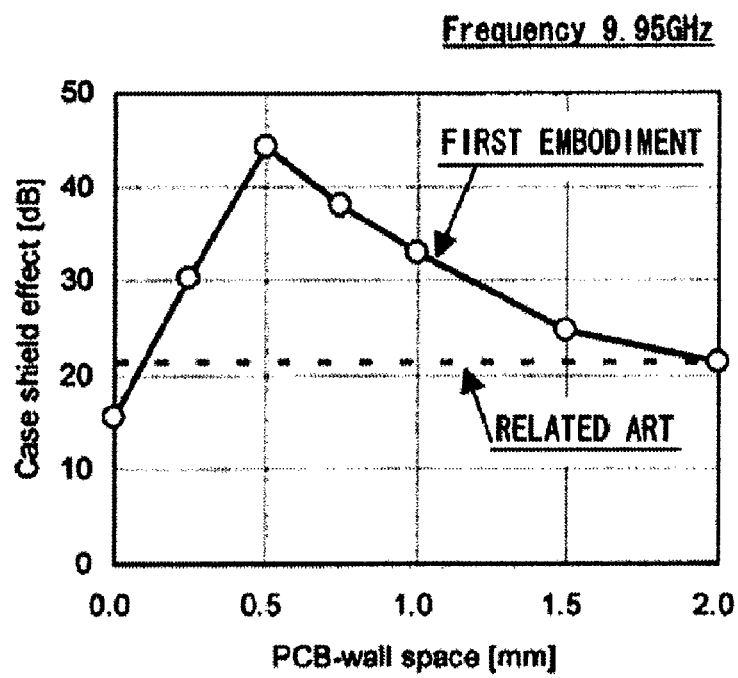
FIG. 5 is a graph showing a case shield effect of the optical transceiver module according to the first embodiment of the present invention.
Figure 6:
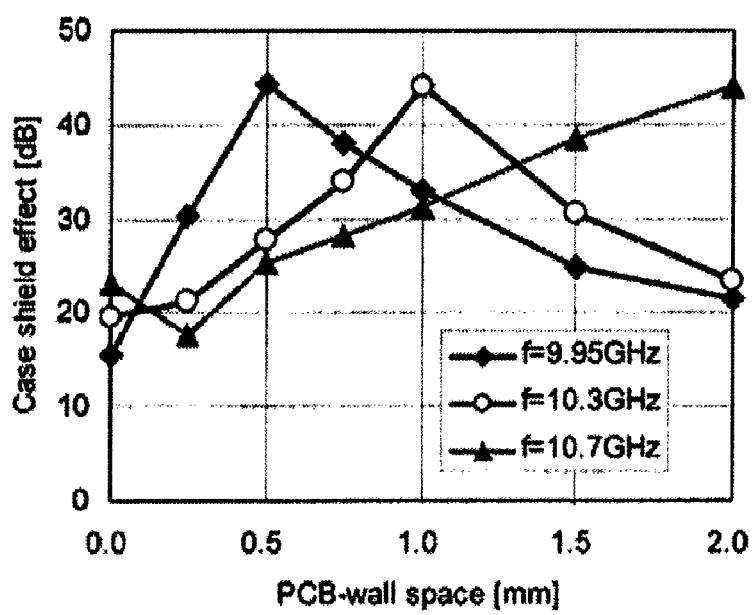
FIG. 6 is a graph showing the case shield effect of the optical transceiver module according to the first embodiment of the present invention.

A first embodiment of the present invention is described with reference to FIGS. 1 to 6. FIG. 1 is a structural view illustrating an appearance of an optical transceiver module according to the first embodiment of the present invention. FIGS. 2 and 3 are exploded perspective views illustrating inner structures of the optical transceiver module according to the first embodiment of the present invention viewed from upper and lower directions. FIG. 4 is a graph showing a change in cavity resonant frequency in an inside of a casing for describing an effect of the first embodiment of the present invention. FIGS. 5 and 6 are graphs showing improvements of a case shield effect for describing an effect of the embodiment of the present invention.

First, a configuration of the optical transceiver module is described with reference to FIGS. 1 to 3. The optical transceiver module according to the first embodiment is compliant with XFP MSA (SFF Committee INF-8077i, "10 Gigabit Small Form Factor Pluggable Module", Revision 4.5 Aug. 31, 2005). In FIG. 1, the optical transceiver module mainly includes an upper casing 100, a lower casing 101, and a handle 110 on an outside thereof. Hereinafter, in the drawings, an x-direction is defined as "front", the opposite direction thereof (-x-direction) as "rear", a z-direction as "upper", and the opposite direction thereof (-z-direction) as "lower".

The optical transceiver module according to the first embodiment is inserted in a transmission device from a rear thereof, and a connector of an optical fiber is inserted in the optical transceiver module from a front thereof, whereby the optical transceiver module is caused to operate. In FIG. 2, a printed circuit board 102, a transmitter optical sub-assembly (TOSA) 108, and a receiver optical sub-assembly (ROSA) 109 are disposed in a cavity formed by the upper casing 100 and the lower casing 101. Flexible printed boards 106 and 107 are respectively provided between the printed circuit board 102 and each of the TOSA 108 and the ROSA 109 so as to connect an electrical signal of 10 Gbit/s.

A driver, a clock data recovery (CDR), and an IC and chip components such as a microprocessor are mounted on the printed circuit board 102 (not shown). The thickness of the printed circuit board 102 is 1 mm. An edge connector 105 is provided on a rear end surface of the printed circuit board 102 and is used for connection with the transmission device. The edge connector 105 is exposed to an exterior from a slot opening on the rear of the upper casing 100 and the lower casing 101, and serves a function of inserting/drawing a hot line. Further, the upper casing 100 and the lower casing 101 are fixed by a screw, and the screw inserted from a screw hole 122 of the lower casing 101 is inserted and fixed in a screw receiver 120 of the upper casing 100 through an opening 121 of the printed circuit board 102. Note that the screw receiver 120 is positioned at a central portion in a y-axis direction at a distance of 16.3 mm (length corresponding to that of an arrow 130 of FIG. 2) apart from a rear end of the upper casing 100, and the diameter and the height of the screw receiver 120 are set to approximately 2.9 mm, 3.9 mm, respectively.

A partition wall 103 is provided inside the upper casing 100. The partition wall 103 is arranged longitudinally at the central portion with respect to the y-axis direction and includes a transmission/reception partition wall 103a making a separation between the TOSA 108 and the ROSA 109 and an upper partition wall 103b provided at a position opposed to a component mounting surface of the printed circuit board 102. The transmission/reception partition wall 103a prevents mutual interference due to electromagnetic waves and the like leaked from the TOSA 108 and the ROSA 109. The upper partition wall 103b is provided at an extension of the x-axis direction of the transmission/reception partition wall 103a to reach the screw receiver 120, and has the length of approximately 25 mm in the x-axis direction (length corresponding to that of an arrow 131 of FIG. 3). A gap is provided between the upper partition wall 103b and the printed circuit board 102 (and the mounted components thereon) so as not to interfere with each other.

In addition, in FIG. 3, a lower partition wall 104 is provided inside the lower casing 101. The lower partition wall 104 is arranged longitudinally at the central portion with respect to the y-axis direction so as to be opposed to the upper partition wall 103b, and has the same length in the x-axis direction as that of the upper partition wall 103b. Further, a gap is provided between the lower partition wall 104 and the printed circuit board 102 so as not to interfere with each other.

Note that, as described below, a dimension of the gap between the printed circuit board 102 and each of the upper partition wall 103b and the lower partition wall 104 affects a suppressing (shielding) effect on generation of unnecessary electromagnetic waves from the optical transceiver module. Further, the thickness of the upper partition wall 103b and the lower partition wall 104 is approximately 0.2 mm.

As a material for the upper casing 100, the partition wall 103, the lower casing 101, and the partition wall 104, metal such as zinc and aluminum is used. The upper casing 100, the partition wall 103, the lower casing 101, and the partition wall 104 may be formed by cutting, but can be made at low cost by being molded integrally by die casting. Further, when being molded integrally by die casting, there is little increase in cost owing to the introduction of the partition walls 103 and 104, which is most suitable for a reduction in cost.

As the printed circuit board 102, there is used one in which multi-layer wiring is formed by means of copper foil on a resin board such as an FR4. As the TOSA 108 and the ROSA 109, there are used ones formed by, for example, a TO-CAN made of metal and a receptacle made of metal or insulator. As the flexible printed boards 106 and 107, there are used ones in which wiring is formed by means of copper foil on both surfaces of a polyimide thin film.

Next, operations and effects of the present invention are described with reference to FIGS. 4 to 6. In the optical transceiver module, when it is assumed that the slit opening of the edge connector portion is sufficiently small, an inner space surrounded by the upper casing and the lower casing made of metal can be assumed to be a space of rectangular solid shape surrounded by conductive walls, thereby having an eigenmode at a frequency fr described in the following expression.

$$f_r = \frac{c}{2\pi}\sqrt{\left(\frac{m\pi}{A}\right)^2 + \left(\frac{n\pi}{B}\right)^2 + \left(\frac{s\pi}{C}\right)^2} \quad \text{[Expression 1]}$$

Herein, "A" represents the length of the rectangular solid in the x-direction; "B", the length of the rectangular solid in the y-direction; "C", the length of the rectangular solid in the z-direction; "c", speed of light in a vacuum; and each of "m", "n", and "s", an integral number. When an excitation source having the frequency near fr is arranged at a position where each eigenmode is excited with respect to the eigenmode, the cavity resonance occurs inside the casing. In a case of the XFP MSA optical transceiver module, the outside dimension is defined in MSA, and the size of the inner space thereof is obtained by subtracting the thickness of the casing from the outside dimension. For example, the dimensions of the inner space is 37 mm×16 mm×5 mm.

In this case, as a result of calculation by a 3-D electromagnetic field simulator, it is found that the eigenmode frequency fr is 10.2 GHz, 12.3 GHz, 15.3 GHz . . . in order of increasing, and exists near 10 GHz. Further, when each of the eigenmodes is described as [mns], those frequencies correspond to [110], [210], [310] . . . .

Accordingly, the eigenmodes have the common characteristics as follows. (1) s=0, that is, even when the z-directional dimension C of the inner space is changed, the eigenmode frequency fr does not change. (2) Surface current occurs in the z-direction (perpendicular direction of inner side surface of metal casing). The printed circuit board having a permittivity of approximately 4 is arranged inside the casing, and hence, in practice, the eigenmode frequency fr slightly shifts to the lower frequency side when compared to the above-mentioned expression. However, generation of the above-mentioned eigenmode can be confirmed by calculating by means of the 3-D electromagnetic field simulator.

According to our examination, it is found that, by providing the partition wall on the surface perpendicular to the y-direction in the inside of the casing, i.e., the central portion of the inner space in the longitudinal direction, it is possible to shift the eigenmode frequency fr to the lower frequency side. It is also found that, by adjusting the height of the partition wall, it is possible to control the eigenmode frequency fr.

FIG. 4 shows a change, due to introduction of the partition wall, in the eigenmode frequency fr of the structure according to the first embodiment, which is obtained by means of the 3-D electromagnetic field simulator. The horizontal axis corresponds to the length of the gap between the printed circuit board 102 and each of the partition walls 103 and 104. As the length is made smaller, that is, the height of the partition walls is made higher, the eigenmodes [110], [210] (though not shown, [310] as well) can be shifted to the lower frequency side. This mechanism can be attained, because the electromagnetic field having a vector in the y-direction gets around the partition walls owing to introduction of the partition walls 103 and 104, and because the function equivalent to extending the y-directional length of the inner space is generated.

FIG. 5 shows a graph comparing the case shield effect between a case in which the partition walls are provided on both the upper casing and the lower casing as the first embodiment and a case in which no partition wall is provided as the related art (structure in which the upper partition wall 103b and the lower partition wall 104 are omitted in FIGS. 2 and 3). The 3-D electromagnetic field simulator is used and the excitation source is arranged near the driver IC on the printed circuit board 102, whereby the shielding effect is obtained by comparing the distant fields with/without the casing. The frequency is set to 9.95 GHz. This is the frequency to be considered at the time of operating at 9.95 Gbit/s in the SONET specification. Note that in this embodiment, the driver IC is arranged rearward at the distance of approximately 12 mm from the flexible printed board 106 connecting the TOSA 108 and the printed circuit board 102, and the excitation source is positioned near the driver IC during the simulation, thereby performing an evaluation. Even when the excitation source is arranged at another different position on the printed circuit board 102 (even on ROSA 109 side of upper partition wall 103b, for example), a large difference in the obtained simulation results cannot be found.

When the partition walls 103b and 104 are provided and the length of the gap between the printed circuit board 102 and each of the partition walls becomes smaller, the shielding effect increases. When the gap is set to 0.25 mm to 1.0 mm, the shielding effect of 30 dB or more is obtained. When the gap is set to 0.5 mm, the shielding effect becomes maximum and an improvement of the shield effect of 20 dB or more is attained when compared to the related art. That is, in order to configure the optical transceiver module operating at only 9.95 Gbit/s, the gap length of 0.5 mm is optimal.

FIG. 6 is a graph showing the case shield effect of the first embodiment at the frequencies of 9.95 Gbit/s, 10.3 Gbit/s, and 10.7 Gbit/s. At the frequency of 10.3 Gbit/s, when the gap between the printed circuit board 102 and each of the partition walls 103b and 104 is set to approximately 0.75 mm to 1.5 mm, the shielding effect of 30 dB or more is obtained. Further, when the gap is set to 1.0 mm, the maximum shielding effect is obtained. That is, in order to configure the optical transceiver module operating at only 10.3 Gbit/s which is compliant with 10 Gigabit Ethernet specification ("Ethernet" is a registered trademark), the gap length of 1.0 mm is optimal. Further, at the frequency of 10.7 Gbit/s, when the gap is set to 1.0 mm to 2.0 mm, the shielding effect of 30 dB or more is also obtained. Therefore, in a case of configuring the optical module compliant with the multi-bit rates of 9.95 Gbit/s, 10.3 Gbit/s, and 10.7 Gbit/s, the gap length of 1.0 mm is desirable.

In the first embodiment, as illustrated in FIGS. 2 and 3, the partition walls 103b and 104 may not be provided to all of the central portion in the longitudinal direction of the inner space between the upper casing 100 and the lower casing 101. The length of the partition walls is approximately 25 mm (length corresponding to that of the arrow 131 of FIG. 3) when measured from an edge of the transmission/reception partition wall 103a in the x-axis direction. According to our examination, it is confirmed that, when the length of the partition walls 103b and 104 is 25 mm or more when measured from the edge of the transmission/reception partition wall 103a in the x-axis direction, substantially the same property as that of this embodiment can be obtained. As a matter of course, the partition walls 103b and 104 can be provided to the entire portion of the inner space, and in this case, the same effect as described above is obtained. Note that the shielding effect does not depend on presence or absence of the transmission/reception partition wall 103a and the screw receiver 120.

According to the first embodiment described above, without reducing the area of the printed circuit board, i.e., without deteriorating the maximum number of the mounted components, the eigenmode frequency near 10 GHz can be adjusted. Further, there is no increase in cost by adding the component, and it is possible to provide the 10 Gbit/s optical transceiver module which is most suitable for reducing unnecessary electromagnetic waves.

Second Embodiment

Figure 7:
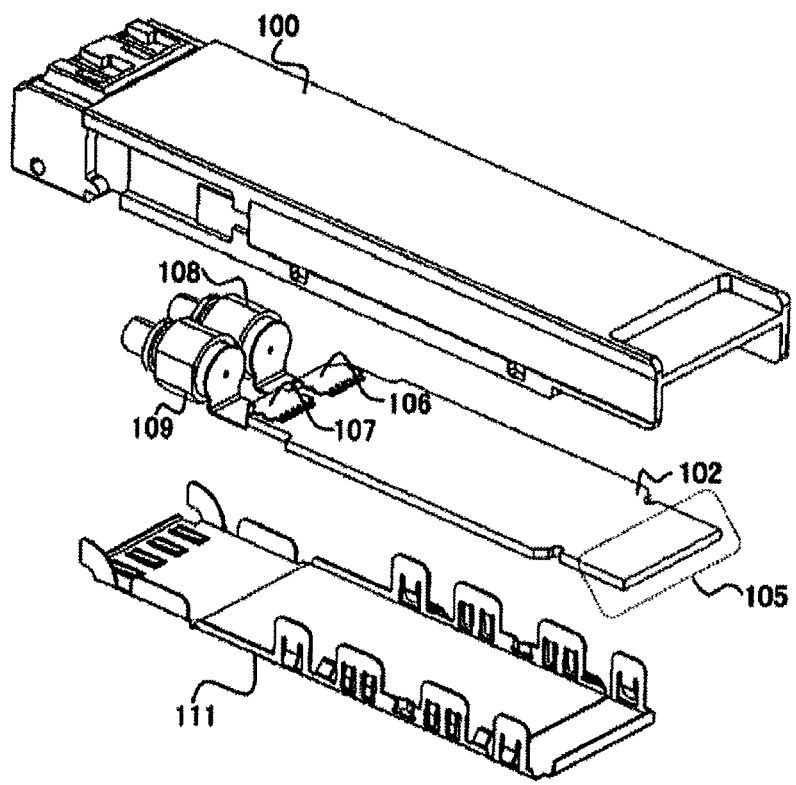
FIG. 7 is a view illustrating an inner structure of a lower casing of an optical transceiver module according to a second embodiment of the present invention.
Figure 8:
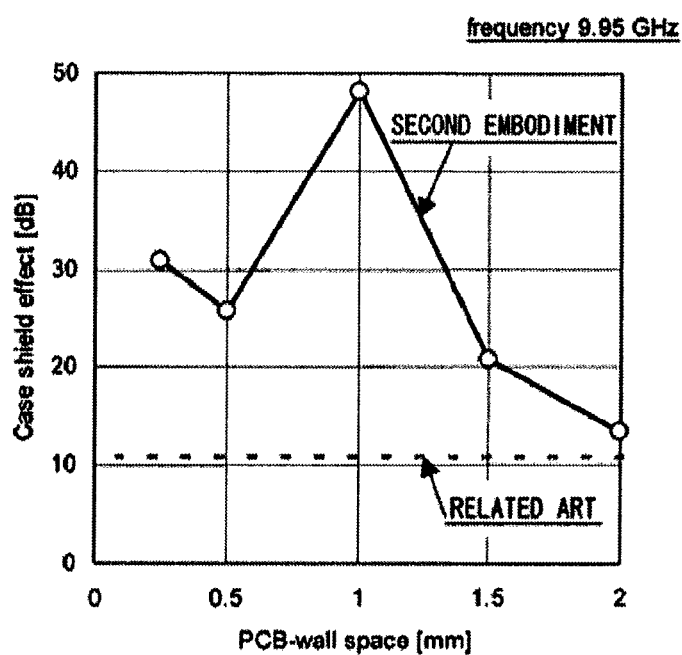
FIG. 8 is a graph showing a case shield effect of the optical transceiver module according to the second embodiment of the present invention.
Figure 9:
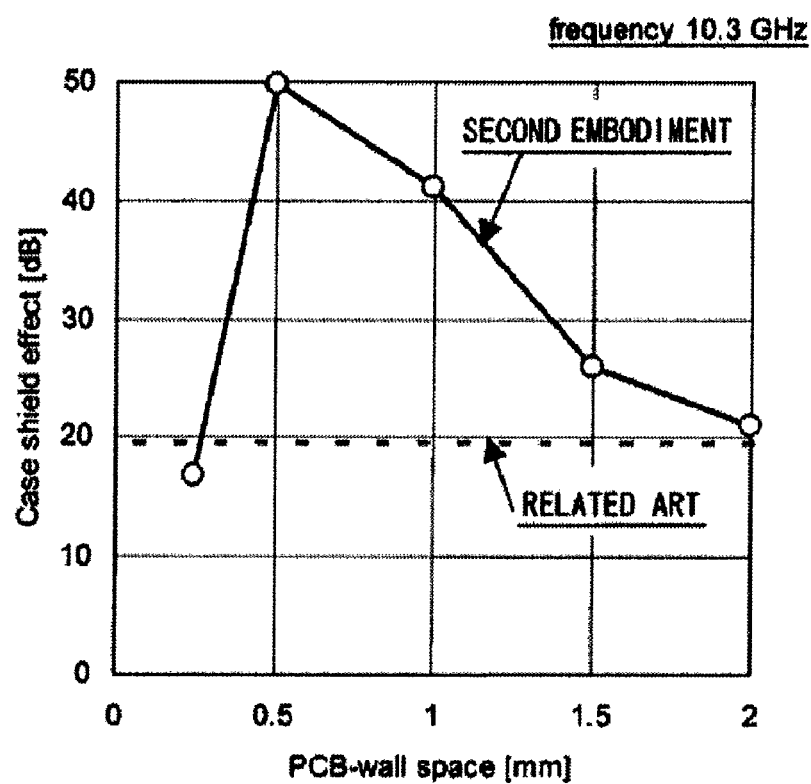
FIG. 9 is a graph showing the case shield effect of the optical transceiver module according to the second embodiment of the present invention.

A second embodiment of the present invention is described with reference to FIGS. 7 to 9. FIG. 7 is a view illustrating an inner structure of a lower casing according to the second embodiment of the present invention. FIGS. 8 and 9 are graphs showing improvements of a case shield effect for describing an effect of the second embodiment of the present invention. The optical transceiver module according to the second embodiment is also compliant with XFP MSA, but is different from that of the first embodiment, as illustrated in FIG. 7, in that the no partition wall is provided on the lower casing 111 and that the lower casing 111 is formed of a sheet metal product. Similarly to the first embodiment, the partition wall 103 is provided on the upper casing 100 (not shown). As a material for the lower casing 111, a stainless plate, a steel plate, or the like is used.

FIG. 8 is a graph comparing the case shield effect between a case in which the partition wall is provided in the upper casing as the second embodiment and a case in which no partition wall is provided as the related art. The frequency is 9.95 GHz. When the gap between the upper partition wall 103b and the printed circuit board 102 is set to 0.25 mm to 1.5 mm, the shielding effect of 20 dB or more is obtained. When the gap is set to 1.0 mm, the maximum shielding effect is obtained and the improvement of the shielding effect of about 40 dB is attained when compared to the related art. That is, in order to configure the optical transceiver module operating at 9.95 Gbit/s which is compliant with SONET specification, the gap length of 1.0 mm is optimal.

Similarly, FIG. 9 is a graph comparing the shielding effect at the frequency of 10.3 GHz. When the gap between the upper partition wall 103b the printed circuit board 102 becomes smaller, the shielding effect increases. When the gap is set to 0.5 mm to 1.0 mm, the improvement of the shielding effect of 20 dB or more is attained when compared to the related art. When the gap is set to 0.5 mm, the improvement of the shielding effect of approximately 30 dB is attained. That is, in order to configure the optical transceiver module operating at 10.3 Gbit/s which is compliant with 10 Gigabit Ethernet specification ("Ethernet" is a registered trademark), the gap length is optimal in the range from 0.5 mm to 1.0 mm, and the gap length of 0.5 is desirable.

According to the second embodiment described above, without reducing the area of the printed circuit board, i.e., without deteriorating the maximum number of the mounted components, the eigenmode frequency near 10 GHz can be adjusted. Further, the low-cost sheet metal product can be used as the lower casing, and it is possible to provide the low-cost 10 Gbit/s optical transceiver module which is most suitable for reducing unnecessary electromagnetic waves.

Third Embodiment

Figure 10:
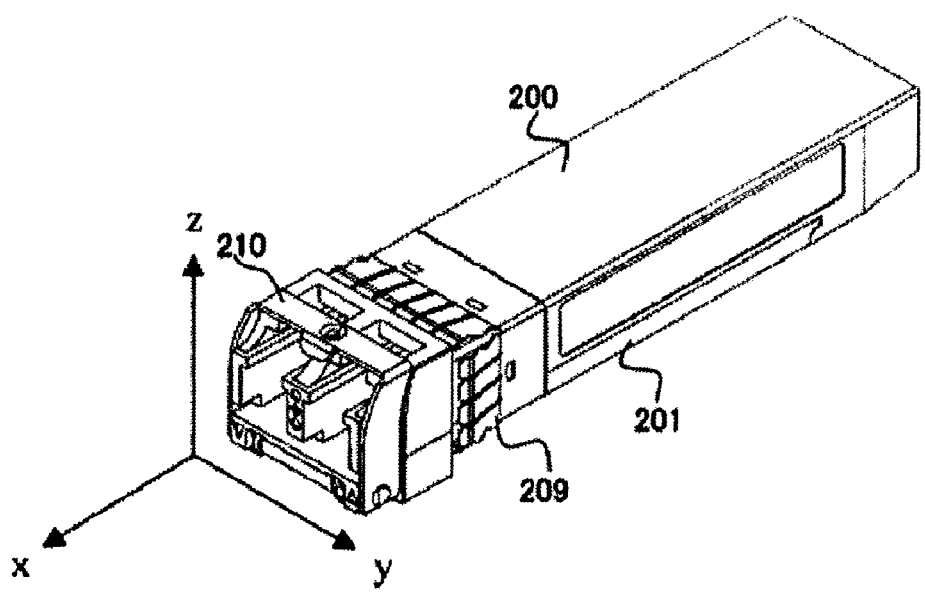
FIG. 10 is a structural view illustrating an appearance of an optical transceiver module according to a third embodiment of the present invention.
Figure 11:
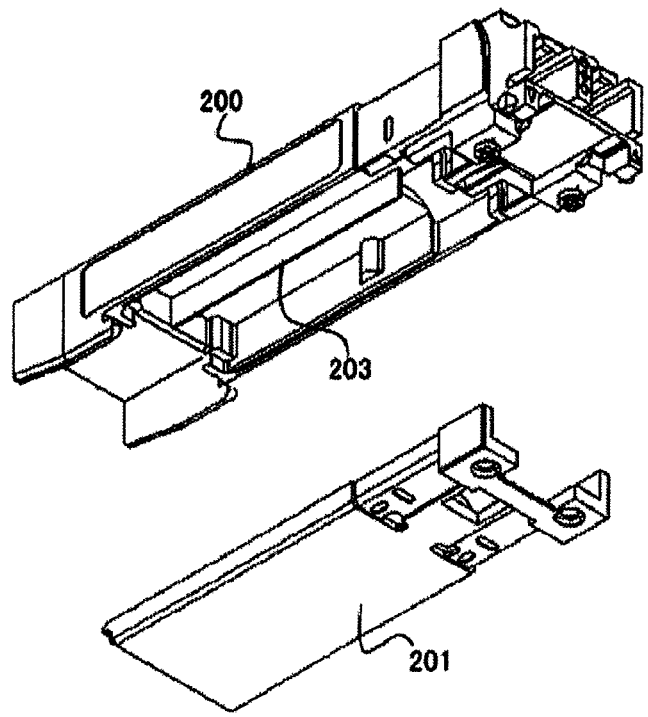
FIG. 11 is a view illustrating an inner structure of an upper casing of the optical transceiver module according to the third embodiment of the present invention.
Figure 12:
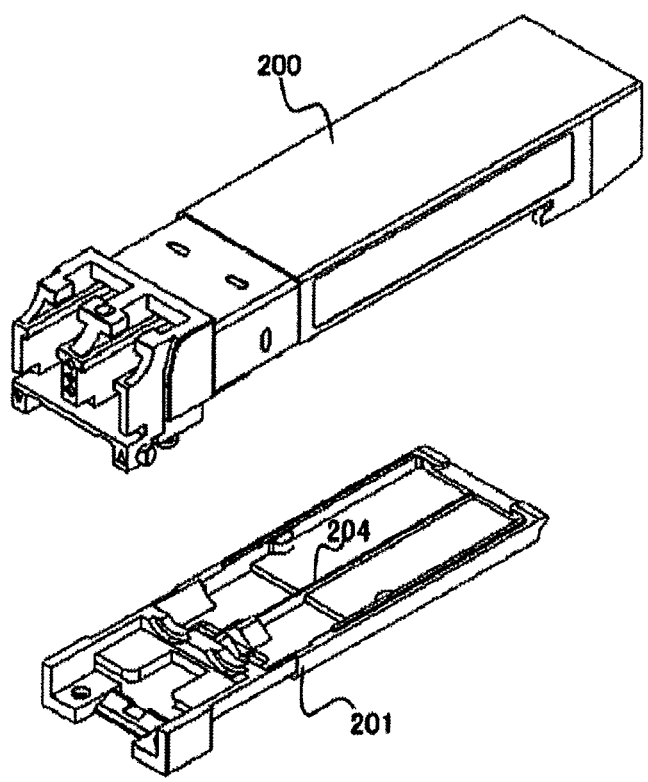
FIG. 12 is a view illustrating an inner structure of a lower casing of the optical transceiver module according to the third embodiment of the present invention.
Figure 13:
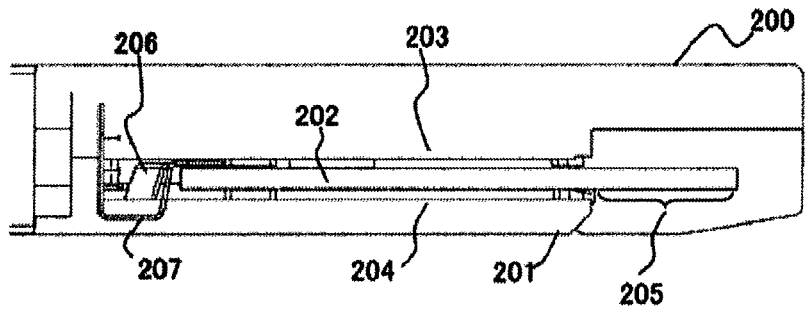
FIG. 13 is a view illustrating a positional relationship between partition walls and a printed circuit board of the optical transceiver module according to the third embodiment of the present invention.
Figure 14:
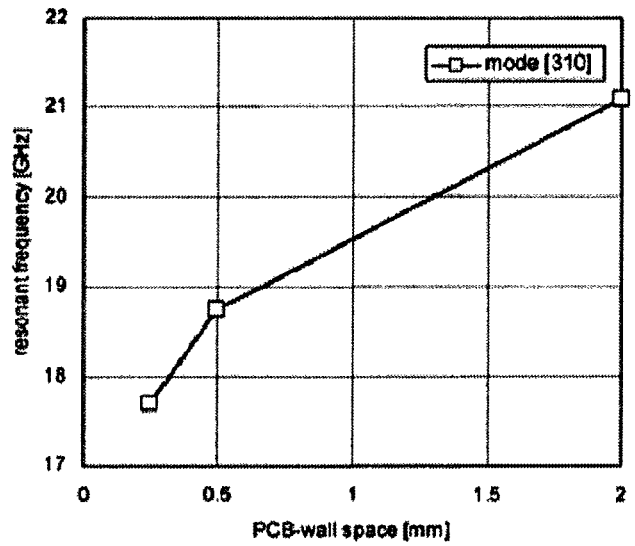
FIG. 14 is a graph showing a change in cavity resonant frequency in an inside of a casing of the optical transceiver module according to the third embodiment of the present invention.
Figure 15:
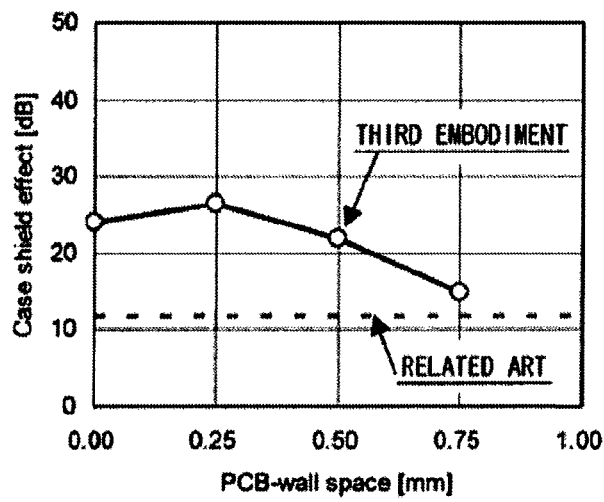
FIG. 15 is a graph showing a case shield effect of the optical transceiver module according to the third embodiment of the present invention.

A third embodiment of the present invention is described with reference to FIGS. 10 to 15. Also in this embodiment, the x-direction is defined as "front", and the z-direction is defined as "upper". FIG. 10 is a structural view illustrating an appearance of an optical transceiver module according to the third embodiment of the present invention. FIGS. 11 and 12 are views illustrating inner structures of the upper and lower casing of the optical transceiver module according to the third embodiment of the present invention. FIG. 13 is a view illustrating a positional relationship between the partition walls and the printed circuit board of the optical transceiver module according to the third embodiment of the present invention. FIG. 14 is a graph showing a change in cavity resonant frequency in an inside of a casing for describing an effect of the third embodiment of the present invention. FIG. 15 is a graph showing an improvement of a case shield effect for describing the effect of the third embodiment of the present invention.

First, a configuration of the optical transceiver module is described with reference to FIGS. 10 to 13. The optical transceiver module according to the third embodiment is compliant with SFP+MSA (SFF Committee, SFF-8431, Specifications for Enhanced 8.5 and 10 GigabitSmall Form Factor Pluggable Module "SFP+", Revision 2.0, Apr. 26, 2007), and is further reduced in size when compared to the XFP type. In FIG. 10, the optical transceiver module mainly includes an upper casing 200, a lower casing 201, a gasket 209, and a handle 210 on an outside thereof. The optical transceiver module according to the third embodiment is inserted in a transmission device from a rear thereof, and a connector of an optical fiber is inserted in the optical transceiver module from a front thereof, whereby the optical transceiver module is caused to operate.

In FIG. 11, an upper partition wall 203 is provided inside the upper casing 200. The upper partition wall 203 is arranged longitudinally at the central portion with respect to the y-axis direction. In FIG. 12, a lower partition wall 204 is provided inside the lower casing 201. The lower partition wall 204 is arranged longitudinally at the central portion with respect to the y-axis direction. FIG. 13 is a sectional view illustrating a surface obtained by longitudinally dividing the optical transceiver module according to the third embodiment at the central portion with respect to the y-axis direction, i.e., the surface obtained by longitudinally dividing the partition walls 203 and 204.

An edge connector 205 is provided on a rear end surface of the printed circuit board 202, and is exposed to an exterior from a slot opening on the rear of the upper casing 200 and the lower casing 201 to be connected to the transmission device. The thickness of the printed circuit board 202 is 1 mm. The partition walls 203 and 204 are provided in the range corresponding to a position except for the edge connector provided on the rear of the printed circuit board 202, and the thickness thereof is 0.2 mm. A gap is provided between the printed circuit board 202 and each of the partition walls 203 and 204 so as not to interfere with each other. Reference symbols 206 and 207 denote flexible printed boards.

As a material for the upper casing 200, the upper partition wall 203, the lower casing 201, and the lower partition wall 204, metal such as zinc and aluminum is used. The upper casing 200, the upper partition wall 203, the lower casing 201, and the lower partition wall 204 may be formed by cutting, but can be made at low cost by being molded integrally by die casting. As the printed circuit board 202, there is used one in which multi-layer wiring is formed by means of copper foil on a resin board such as an FR4. As the flexible printed boards 206 and 207, there are used ones in which wiring is formed by means of copper foil on both surfaces of a polyimide thin film.

Next, the effect of the third embodiment is described with reference to FIGS. 14 and 15. FIG. 14 shows a change in the eigenmode frequency fr of the structure according to the third embodiment, which is obtained by means of the 3-D electromagnetic field simulator. The eigenmode [310] exists near 20 GHz. The horizontal axis corresponds to the length of the gap between the printed circuit board 202 and each of the partition walls 203 and 204. It is found that, as the length is made smaller, that is, the height of the partition walls is made higher, the eigenmode [310] can be shifted to the lower frequency side and that the eigenmode frequency fr can be controlled by adjusting the height thereof.

FIG. 15 shows a graph comparing the case shield effect between a case in which the partition wall is provided on both the upper casing and the lower casing as the third embodiment and a case in which no partition wall is provided as the related art. The frequency is set to 20.6 GHz. This is because it is necessary to consider the eigenmode [310] which exists near 20 GHz as described above at the time of operating at 10.3 Gbit/s in the 10 Gigabit Ethernet specification ("Ethernet" is a registered trademark).

When the partition walls 203 and 204 are provided and the length of the gap between the printed circuit board 202 and each of the partition walls becomes smaller, the shielding effect increases. When the gap is set to 0.25 mm, the shielding effect becomes maximum. When the gap is set to 0.5 mm or less, an improvement of the shielding effect of 10 dB or more is attained when compared to the related art.

According to the third embodiment described above, without reducing the area of the printed circuit board, i.e., without deteriorating the maximum number of the mounted components, the eigenmode frequency near 20 GHz can be adjusted. Further, there is no increase in cost by adding the component, and it is possible to provide the 10 Gbit/s optical transceiver module which is most suitable for achieving a reduction of unnecessary electromagnetic waves at low cost.

While there have been described what are at present considered to be certain embodiments of the invention, it will be understood that various modifications may be made thereto, and it is intended that the appended claims cover all such modifications as fall within the true spirit and scope of the invention.

What is claimed is:
1. An optical transceiver module, comprising:
an upper casing having an electrical conductivity;
a lower casing having an electrical conductivity;
a printed circuit board;
a receiver optical sub-assembly; and
a transmitter optical sub-assembly,
the upper casing and the lower casing forming a casing having a cavity in an inside thereof, the printed circuit board, the receiver optical sub-assembly, and the transmitter optical sub-assembly being arranged in the inside of the casing, the printed circuit board and each of the receiver optical sub-assembly and the transmitter optical sub-assembly being electrically connected with each other, a connecting portion of an optical signal with respect to the receiver optical sub-assembly and the transmitter optical sub-assembly being provided at a front end portion of the casing, the printed circuit board comprising an edge connector having an electrode arranged therein, the edge connector of the printed circuit board being extended to an exterior from a slit opening provided on a rear end portion of the casing, wherein a partition wall having an electrical conductivity is provided on at least one of the upper casing and the lower casing in a longitudinal direction, the partition wall being arranged at a central portion in a transverse direction of one of the upper casing and the lower casing and at a position opposed to the printed circuit board.

2. An optical transceiver module according to claim 1, wherein
the partition walls are provided on both the upper casing and the lower casing, and
a minimum gap between each of the partition walls and the printed circuit board ranges from 0.25 mm to 1.0 mm.

3. An optical transceiver module according to claim 2, wherein the minimum gap between each of the partition walls and the printed circuit board is 0.5 mm.

4. An optical transceiver module according to claim 1, wherein
the partition walls are provided on both the upper casing and the lower casing, and
a minimum gap between each of the partition walls and the printed circuit board ranges from 0.75 mm to 1.5 mm.

5. An optical transceiver module according to claim 4, wherein the minimum gap between each of the partition walls and the printed circuit board is 1.0 mm.

6. An optical transceiver module according to claim 1, wherein outer structures of the upper casing and the lower casing are compliant with an XFP standard in MSA.

7. An optical transceiver module according to claim 1, wherein at least one of the upper casing and the lower casing is integrally molded by die casting.

8. An optical transceiver module according to claim 1, wherein
the partition wall is provided only on the upper casing, and
the minimum gap between the partition wall and the printed circuit board ranges from 0.25 mm to 1.5 mm.

9. An optical transceiver module according to claim 8, wherein the minimum gap between the partition wall and the printed circuit board is 1.0 mm.

10. An optical transceiver module according to claim 1, wherein
the partition wall is provided only on the upper casing, and
the minimum gap between the partition wall and the printed circuit board ranges from 0.5 mm to 1.0 mm.

11. An optical transceiver module according to claim 10, wherein the minimum gap between the partition wall and the printed circuit board is 0.5 mm.

12. An optical transceiver module according to claim 8, wherein outer structures of the upper casing and the lower casing are compliant with an XFP standard in MSA.

13. An optical transceiver module according to claim 8, wherein the lower casing is manufactured by sheet metal working.

14. An optical transceiver module according to claim 1, wherein
the outer structures of the upper casing and the lower casing are compliant with a SFP+ standard in MSA,
the partition walls are provided on both the upper casing and the lower casing, and
the minimum gap between each of the partition walls and the printed circuit board is 0.5 mm or less.

15. An optical transceiver module according to claim 14, wherein the minimum gap between each of the partition walls and the printed circuit board is 0.25 mm.

16. An optical transceiver module according to claim 14, wherein at least one of the upper casing and the lower casing is integrally molded by die casting.

* * * * *